United States Patent
Sohn

(10) Patent No.: US 6,459,675 B2
(45) Date of Patent: Oct. 1, 2002

(54) SELF-COMPENSATING BALANCER FOR DISK PLAYER AND TURNTABLE FOR THE SAME

(75) Inventor: Jin-seung Sohn, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 82 days.

(21) Appl. No.: 09/725,885

(22) Filed: Nov. 30, 2000

(30) Foreign Application Priority Data

Feb. 29, 2000 (KR) .......................................... 2000-10060

(51) Int. Cl.[7] .......................... H02K 7/04; G11B 19/20; F16F 15/32
(52) U.S. Cl. ......................................... 369/264; 369/263
(58) Field of Search .................................. 369/236, 264; 360/99.08, 266; 74/513

(56) References Cited

U.S. PATENT DOCUMENTS

| | | | | |
|---|---|---|---|---|
| 4,441,178 A | * | 4/1984 | Kobayashi et al. | ......... 369/270 |
| 5,111,713 A | * | 5/1992 | Cameron et al. | .............. 74/573 |
| 6,005,311 A | * | 12/1999 | Matsushima | .................. 310/51 |
| 6,005,749 A | * | 12/1999 | Ikuta et al. | .............. 360/99.12 |
| 6,061,325 A | * | 5/2000 | Zaun | ............................ 369/264 |
| 6,155,134 A | * | 12/2000 | Ikuta et al. | .................... 74/573 |
| 6,243,351 B1 | * | 6/2001 | Huang | ......................... 369/263 |
| 6,330,220 B1 | * | 12/2001 | Shiga et al. | ................. 369/263 |
| 6,373,154 B1 | * | 4/2002 | Sohn et al. | .................... 310/51 |

FOREIGN PATENT DOCUMENTS

JP    2001-258203    *    9/2001    ............ H02K/7/04

* cited by examiner

*Primary Examiner*—William Korzuch
*Assistant Examiner*—Christopher R Beacham
(74) *Attorney, Agent, or Firm*—Sughrue Mion, PLLC

(57) ABSTRACT

A self-compensating balancer for a disk player is provided and includes a supporting plate fixed to a rotating shaft of a spindle motor for supplying rotary power to a disk. Pivot pins are installed in the supporting plate and two or more pendulums are arranged around the supporting plate. The pivot pins and pendulums are linked by connectors, such that upon rotation of the shaft, the connectors are elastically transformed and a centroid of the pendulums faces a centroid of the disk, centered around the rotating shaft of the spindle motor, due to a centrifugal force.

6 Claims, 4 Drawing Sheets

SELF-COMPENSATING BALANCER FOR DISK PLAYER AND TURNTABLE FOR THE SAME

BACKGROUND OF THE INVENTION

1. Field of the Invention

The present invention relates generally to disk players and, more particularly, to a self-compensating balancer for a disk player that is capable of preventing internal vibrations caused by eccentric center of mass of a disk and a turntable combined therewith.

2. Description of the Related Art

In general, disk players, for recording information on recording media such as compact disks (CDs), CD-ROMs, digital versatile disks (DVDs) and for reproducing recorded information from the recording media, must protect the disks and optical pickups from external shock and internal vibration.

In general, as shown in FIG. 1, a disk player includes a vertically rotatable deck base 10 hinged to a housing, a deck plate 20 combined with the deck base 10, a spindle motor 21 installed on the deck plate 20 for providing rotary power to a disk 1, and a turntable 23 combined with a rotating shaft 22 of the spindle motor 21, on which the disk 1 is loaded. Also included are a damper 40 and an optical pickup 25, which are installed on the upper internal surface of the housing so as to face the turntable 23. Here, the damper 40 clamps the disk 1 to the turntable 23. The optical pickup 25 is combined with the deck plate 20 so that the optical pickup 25 can be transferred in the radial direction of the disk 1, during recording and reproducing operations.

A damper 30 is installed between the deck base 10 and the deck plate 20. The damper 30 absorbs external vibrations directly transmitted to the deck plate 20, the spindle motor 21, and the optical pick-up 25, through the deck base 10. The damper 30 is formed of a material such as soft rubber or polyurethane.

The disk player having the above structure can effectively protect the disk 1 and the optical pick-up 25 from an external shock. However, a method of easing the internal vibration caused by the eccentric mass of the disk 1 during the rotation of the spindle motor 21 has not been considered. The disk 1 has an eccentric center of mass caused by a discordance between the center of gyration of the disk 1 and the centroid of the disk 1 caused by errors in the manufacturing processes thereof. The rotating shaft 22 of the spindle motor 21 revolves due to the eccentric mass of the disk 1, during the rotation of the disk 1. The influence of the revolution of the rotating shaft 22 does not have a significant effect in a low-speed model such as 1× and 2×speed models. However, the eccentric rotation does make it difficult to record information on and reproduce information from the recording media in a high-speed model such as a 6× or 8×speed model.

SUMMARY OF THE INVENTION

In order to solve the above problems, it is an object of the present invention to provide a self-compensating balancer for a disk player and a turntable combined with the same, which are capable of preventing internal vibrations caused by an eccentric mass of a disk during high-speed rotation.

To achieve the above object, there is provided a self-compensating balancer for a disk player, comprising a supporting plate fixed to a shaft rotated by a spindle motor for supporting rotary power to a disk, pivot pins installed in the supporting plate, two or more pendulums arranged around the supporting plate, and connectors for connecting the pendulums to the pivot pins. The connectors are operative to be elastically transformed so that the centroid of the pendulums faces the centroid of the disk, centered around the rotating shaft of the spindle motor, due to a centrifugal force, during the rotation of the disk.

The connectors are preferably thin strings that can be bent by an external force.

One or more connectors are preferably formed of nylon resin that can be bent by the external force.

To achieve the above object, there is provided a turntable combined with a self-compensating balancer for a disk player, comprising a seating unit, having a protrusion to which the central hole of a disk is combined and rotated in combination with the rotating shaft of a motor. A supporting plate is fixed to the rotating shaft so as to be separated from the seating unit by a predetermined distance and a plurality of pendulums are interposed between the seating unit and the supporting plate, such that the pendulums do not interfere with each other. A plurality of pivot pins are installed between the seating unit and the supporting plate. Connectors are provided for connecting the pivot pins to the pendulums. The connectors are capable of being elastically transformed so that a centroid of the pendulums faces a centroid of the disk centering around the rotating shaft during the rotation of the disk and, thus, the internal vibration caused by the eccentric mass of the disk is prevented.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE PREFERRED EMBODIMENTS

Figure 1:
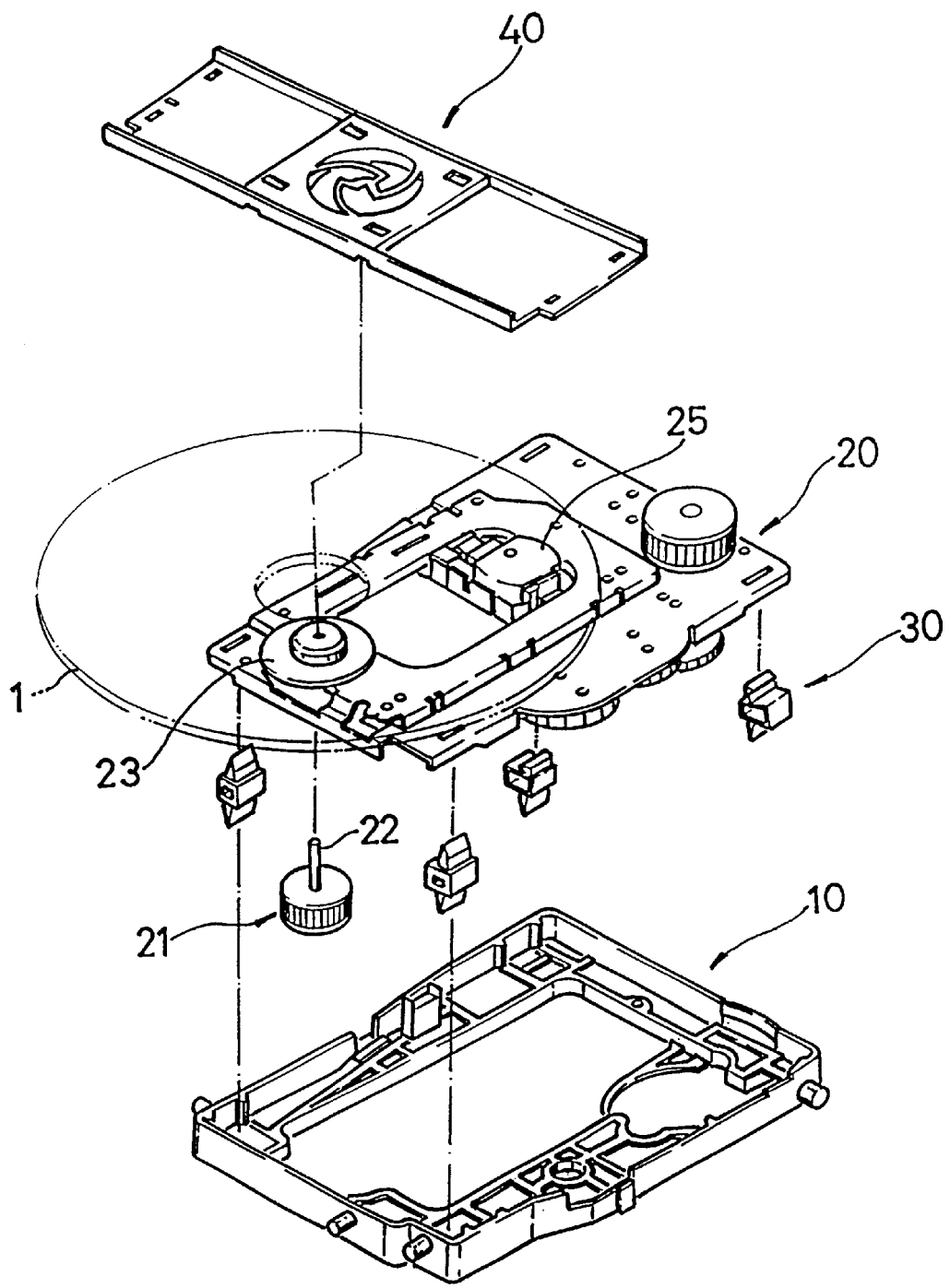
FIG. 1 is a schematic exploded perspective view showing a conventional disk player.
Figure 2:
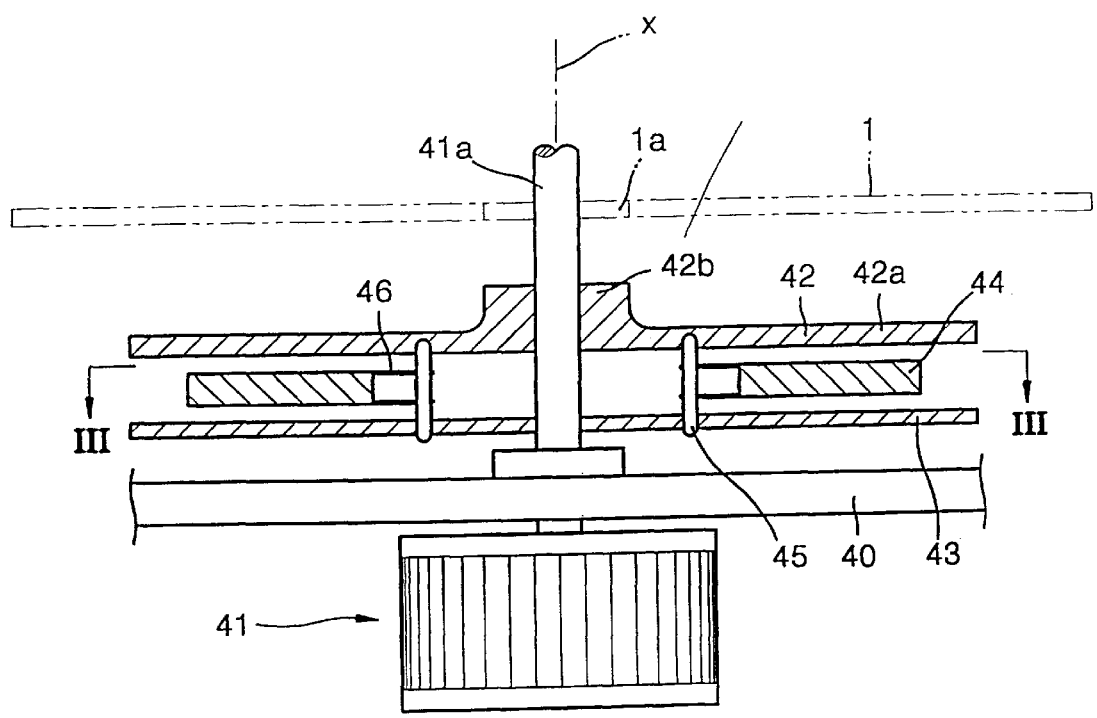
FIG. 2 is a schematic sectional view showing a self-compensating balancer and a turntable combined with the self-compensating balancer according to an embodiment of the present invention.

Referring to FIG. 2, a spindle motor 41 for rotating a disk 1 is supported by a deck plate 40 installed in the housing of a disk player. A turntable combined with a self-compensating balancer according to an embodiment of the present invention is installed with a rotating shaft 41a of the spindle motor 41. The turntable supports the disk 1 and prevents vibration and noise caused by an eccentric mass of the disk 1.

The turntable combined with the self-compensating balancer includes a first supporting plate 42 and a second supporting plate 43 fixed to the rotating shaft 41a. A plurality of pendulums 44 are interposed between the first 42 and second 43 supporting plates. A plurality of pivot pins 45 are inserted between the first 42 and second 43 supporting plates. A plurality of connectors 46 respectively join the plurality of pendulums 44 to the plurality of pivot pins 45.

The first 42 and second 43 supporting plates are installed in parallel and are separated from each other by a predetermined distance in a direction vertical to the axial direction X of the rotating shaft 41a. The first supporting plate 42 forms a seating unit having a seating surface 42a for seating the disk 1. A protrusion 42b protrudes above a center of the first supporting plate 42 so as to be combined with a central hole 1a of the disk 1. The first supporting plate 42 is rotated together with the second supporting plate 43 by driving the spindle motor 41, in a state in which the first supporting plate 42 supports the disk 1. Also, the first 42 and second 43 supporting plates are connected to each other by the pivot pins 45. The pivot pins 45 are for supporting the motion of the pendulums 44 and are installed around the rotating shaft 41a so that they are parallel to the axial direction x of the rotating shaft 41a.

Figure 3:
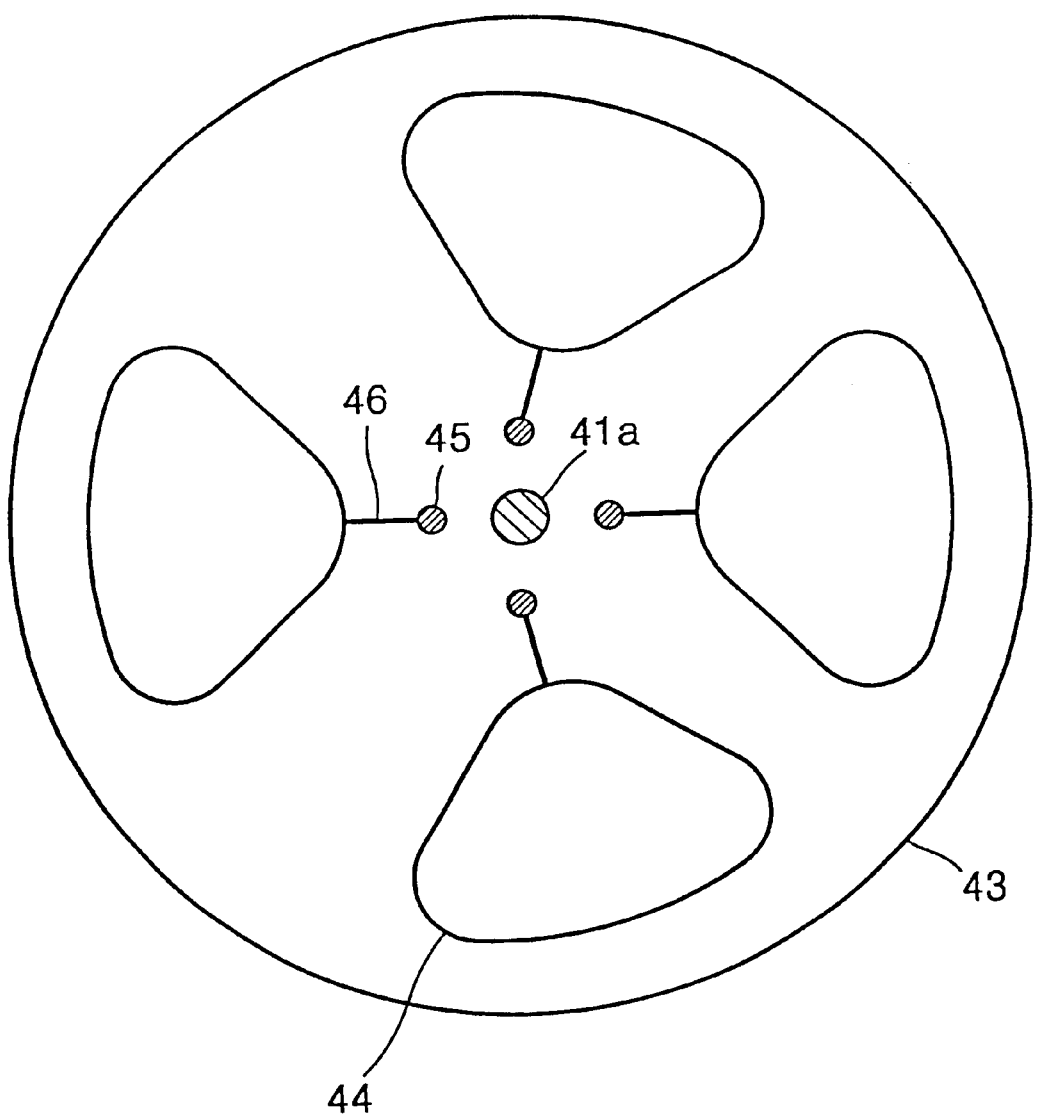
FIG. 3 is a partial sectional view taken along the line III—III of FIG. 2.

The plurality of pendulums 44 are installed between the first 42 and second 43 supporting plates. The pendulums 44 are preferably in the form of plates, as shown in FIG. 3. The pendulums 44 in the form of plates are positioned to be parallel to the first 42 and second 43 supporting plates. Accordingly, it is possible to prevent the pendulums 44 from interfering with each other. Also, the pendulums 44 are separated from each other so as not to interfere with each other. An end of each of the pendulums 44 is respectively connected to each of the pivot pins 45 by the connectors 46.

The connectors 46 preferably comprise string that can be bent even by a very small external force. Therefore, a plurality of strings are connected to the pivot pins 45 and the pendulums 44. Also, the string is preferably formed of thin iron that has a low stiffness and which is not easy to cut, so as to be bent even by the small eccentric mass of the disk 1.

Figure 4:
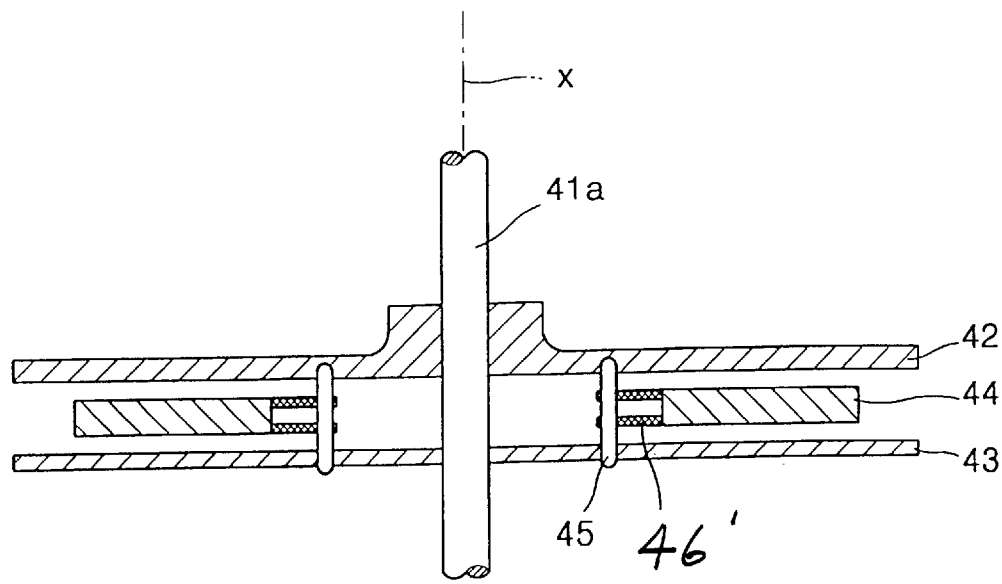
FIGS. 4 and 5 are schematic partial sectional views showing other embodiments of the connector shown in FIG. 3.

As shown in FIG. 4, the pivot pins 45 and the pendulums 44 can be connected by a plurality of connectors 46' formed of synthetic resin such as nylon. In this case, the connectors 46' can be formed by an injection molding process using the synthetic resin, which has a low stiffness. The connectors 46' are respectively connected to the pendulums 44 and the pivot pins 45 by bonding or clamping.

Figure 5:
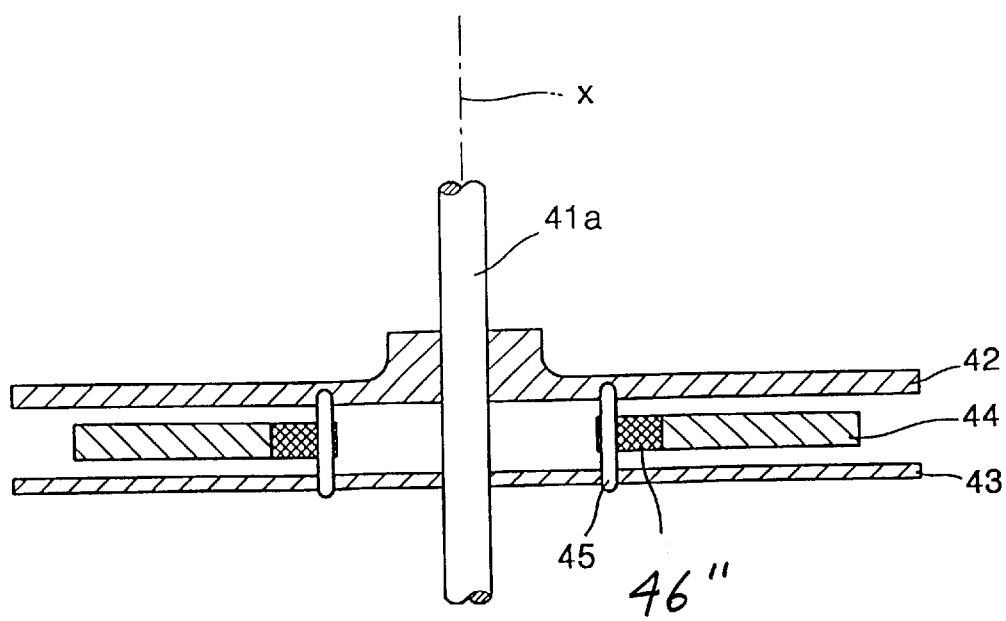

In a further embodiment, as shown in FIG. 5, the pivot pin 45 and the pendulum 44 are connected to each other by a connector 46", which is formed of nylon and has a similar thickness as that of the pendulum 44. In this case, the connector 46" is elastically transformed so that the pendulum 44 minutely rotates by a small force centered around the pivot pin 45; that is, a pendulum motion can be obtained.

In the device having the above structure, when the number of rotations of the disk 1 is larger than the natural frequency of the disk 1 and when the disk actually rotates at normal speed, the pendulum 44 moves to a position where the eccentric mass of the disk 1 is compensated for when the connectors 46 are elastically transformed due to a centrifugal force. Thus, according to the invention, the pendulum 44 is disposed in such a position that compensation is made for the eccentric mass of the disk 1. Namely, on the basis of the rotating shaft 41a, the resonance center of the disk 1 and the position of the eccentric mass of the disk 1 are on the same side and the centroid of the self-compensating balancer, that is, the position of the compensating mass is on the side opposite to the oscillation center of the disk and the position of the eccentric mass of the disk 1, due to the centrifugal force. Therefore, non-equilibrium with respect to the eccentric mass of the disk 1 is offset. Accordingly, the oscillation radius of the rotating shaft 41a is significantly reduced. Also, the internal exciting force of the deck plate 40 with respect to the eccentric mass of the disk 1 is relaxed. In particular, according to the present invention, a frictional force does not exist between the pendulums 44, the pivot pins 45 and the elastically transformed connectors 46. Accordingly, the pendulums 44 can be appropriately moved. Therefore, since the eccentric mass of the disk 1 is minute, it is possible to prevent even vibrations caused by a minute eccentric mass of the disk 1 although the centrifugal force applied to the pendulums 44 is weak.

The self-compensating balancer for the disk player according to the present invention and the turntable combined with the same have simple structures that can simultaneously perform the function of balancing the eccentric mass of the disk and the function of supporting and rotating the disk.

Also, the pendulums can easily move without being affected by friction caused by the rotation of the pivot pins, by connecting the pendulums to the pivot pins by the connectors that can be elastically transformed. Therefore, the pendulums are easily moved to positions where the eccentric mass is compensated for by the minute force caused by the eccentric mass of the disk. Accordingly, it is possible to effectively prevent the internal vibration.

Also, it is possible to drive a disk player at a high speed of 6x speed or greater by using the self-compensating balancer and the turntable according to the present invention for the disk player.

It is contemplated that numerous modifications may be made to the apparatus of the present invention without departing from the spirit and scope of the invention as defined in the claims.

What is claimed is:

1. A self-compensating balancer for a disk player, comprising:
   a shaft rotated by a spindle motor;
   a supporting plate fixed to the shaft for supporting rotary power to a disk;
   a plurality of pivot pins installed in the supporting plate;
   a plurality of pendulums arranged around the supporting plate; and
   a plurality of connectors that respectively connect the plurality of pivot pins to the plurality of pendulums, wherein the plurality of connectors are elastically transformed so that a centroid of the plurality of pendulums faces the centroid of the disk, centered around the rotating shaft of the spindle motor, due to a centrifugal force, during the rotation of the disk.

2. The self-compensating balancer of claim 1, wherein the plurality of connectors comprise thin strings that can be bent by an external force.

3. The self-compensating balancer of claim 1, wherein one or more of the plurality of connectors are formed of nylon resin that can be bent by an external force.

4. A turntable combined with a self-compensating balancer for a disk player, comprising:
   a shaft rotated by a spindle motor;
   a seating unit fixed to the shaft and rotated in combination with the shaft, the seating unit having a protrusion to which a central hole of a disk is combined;
   a supporting plate fixed to the shaft so as to be separated from the seating unit by a predetermined distance;
   a plurality of pendulums interposed between the seating unit and the supporting plate such that the pendulums do not interfere with each other;
   a plurality of pivot pins installed between the seating unit and the supporting plate; and
   a plurality of connectors, which respectively connect the plurality of pendulums to the plurality of pivot pins, wherein the plurality of connectors are elastically transformed upon rotation of the seating unit so that a centroid of the pendulums faces a centroid of the disk centering around the rotating shaft and thus, an internal vibration caused by an eccentric mass of the disk is prevented.

5. The turntable of claim 4, wherein the plurality of connectors comprise thin strings that can be bent by an external force.

6. The turntable of claim 4, wherein one or more of the plurality of connectors are formed of nylon resin that can be bent by an external force.

* * * * *